United States Patent [19]
Masser

[11] 3,929,347
[45] Dec. 30, 1975

[54] TANDEM WHEEL SUSPENSION SYSTEM FOR CLOSELY ADJACENT WHEELS

[75] Inventor: Lloyd D. Masser, Muskegon, Mich.

[73] Assignee: Lear Siegler, Inc., Santa Monica, Calif.

[22] Filed: Aug. 26, 1974

[21] Appl. No.: 500,479

[52] U.S. Cl. ............................ 280/104.5 R; 267/52
[51] Int. Cl.² .................... B62D 59/00; B60G 11/04
[58] Field of Search ................ 267/52; 280/104.5 R

[56] References Cited
UNITED STATES PATENTS

| | | | |
|---|---|---|---|
| 3,151,854 | 10/1964 | Felburn | 267/52 |
| 3,645,555 | 2/1972 | Traylor | 267/52 |
| 3,727,939 | 4/1973 | Mykolenko | 267/52 |

*Primary Examiner*—James B. Marbert
*Attorney, Agent, or Firm*—McGarry & Waters

[57] ABSTRACT

A suspension system for tandem mounted pairs of closely adjacent wheels which are positioned beneath each side of a vehicle such as trailer vehicles. The supsenion includes at least first and second leaf springs and at least first, second, and third U-shaped hanger brackets mounted in spaced relationship and inverted manner to the underside of the frame of the vehicle. A pair of rigid identical equalizer brackets are pivotably mounted in facing relationship at least to the second U-shaped hanger bracket. The first leaf spring is pivotably supported between the first hanger bracket and the equalizer bracket. The second leaf spring is pivotably mounted to the equalizer bracket at one end and pivotably mounted to the second hanger bracket at the other end. When more than two leaf springs are suspended in tandem, another pair of equalizer brackets are mounted on the third U-shaped hanger brackets and the second leaf spring is pivotably mounted at one end to the first pair of equalizer brackets and at the other end to the second pair of equalizer brackets. The equalizer brackets as well as the first, second and third U-shaped brackets are made from an identical blank of sheet metal. Special mounting means and rubber bushings are provided between at least one pivotable connection between at least one leaf spring and the equalizer bracket or mounting bracket.

10 Claims, 7 Drawing Figures

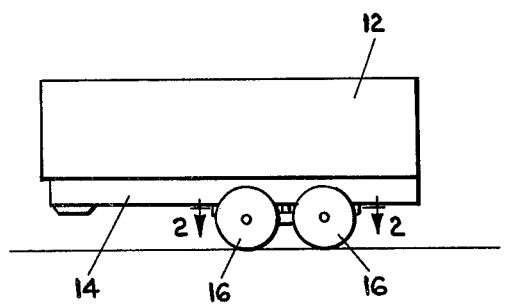
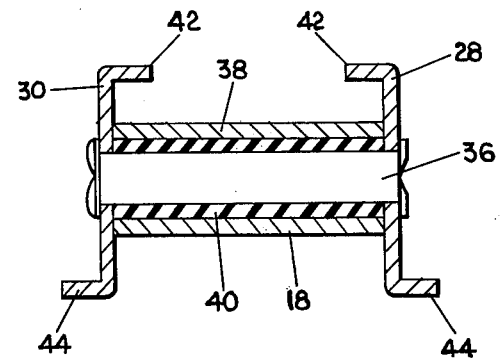
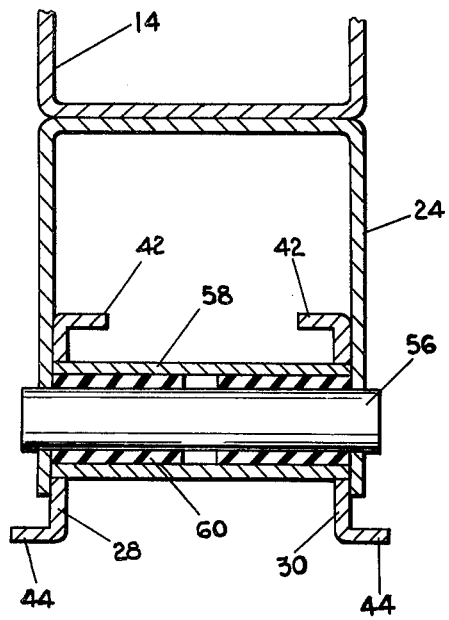
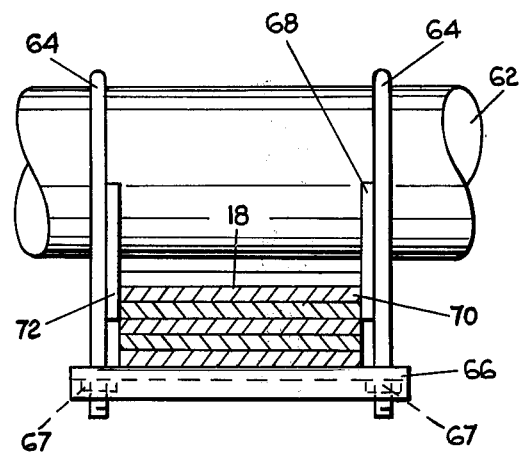
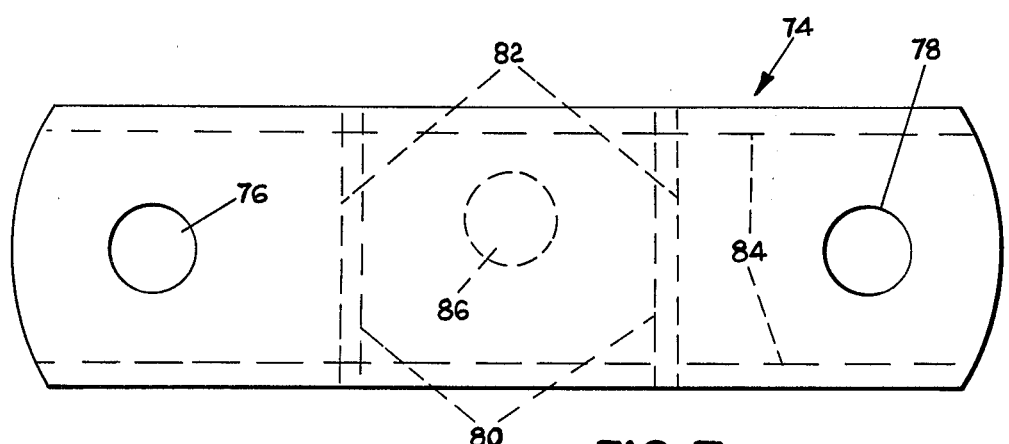

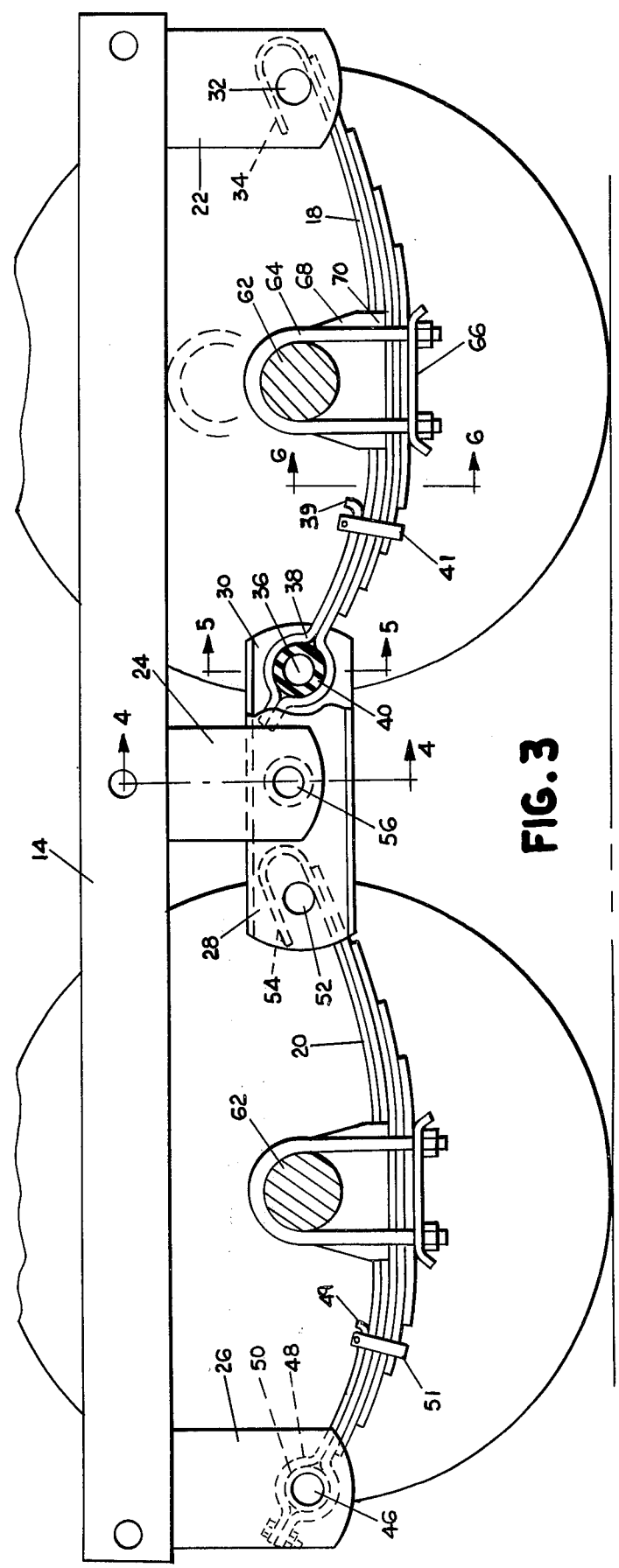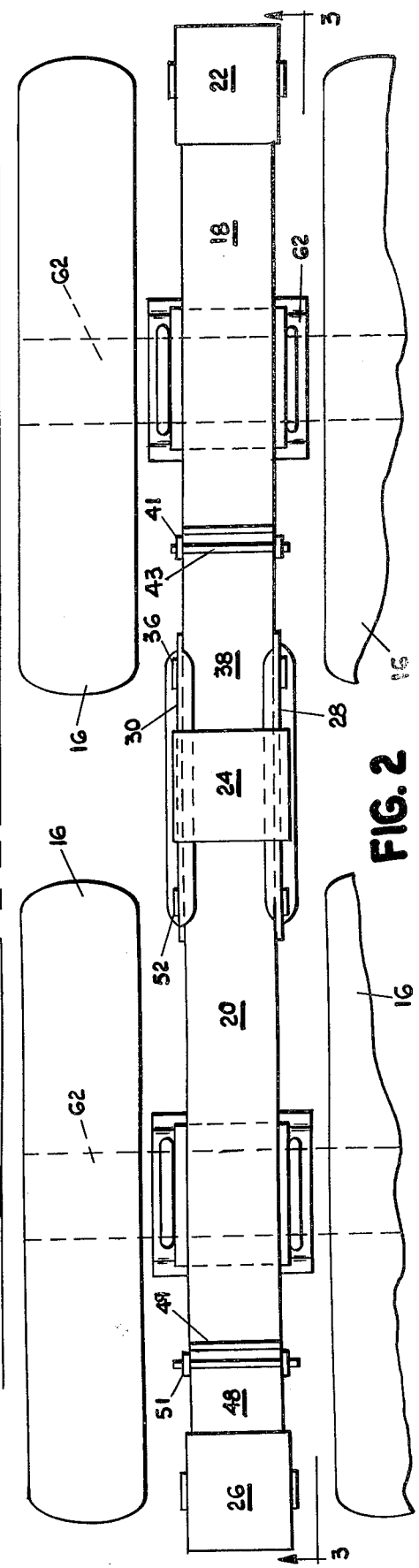

TANDEM WHEEL SUSPENSION SYSTEM FOR CLOSELY ADJACENT WHEELS

BACKGROUND OF THE INVENTION

1. Field of the Invention

This invention relates to suspension systems for vehicles. In one of its aspects, the invention relates to suspension systems for tandem mounted pairs of closely adjacent wheels wherein the suspension system is provided between the pairs of closely adjacent wheels.

2. State of the Prior Art

In the U.S. Pat. No. 3,116,341 to Flowers, there is disclosed a tandem running gear assembly wherein pairs of closely adjacent wheels are mounted in tandem beneath the frame of a vehicle. The axles of the pairs of wheels are suspended through a pair of leaf springs which are spaced from each other. The pairs of leaf springs are coupled together in tandem fashion through a pivotably mounted equalizer element. The pairs of leaf springs of the Flower Pat. must be exactly equal in length and deflection in order to avoid slight misalignment of the axles. Excessive tire wear results from slight misalignment of the axles. Differences in spring lengths may, for example, result from replacing a broken spring or merely from differences in manufacturing tolerances.

U.S. Pat. No. 3,690,491 to Butler discloses a reel trailer having pairs of closely adjacent wheels mounted to the trailer through a single leaf spring suspension therebetween. The leaf spring suspension otherwise appears to be conventional.

SUMMARY OF THE INVENTION

According to the invention, a suspension system is provided for tandem mounted pairs of closely adjacent wheels with a single suspension system between the tandem mounted wheels. The suspension system includes at least first and second leaf springs, means supporting the leaf springs in tandem beneath the vehicle, and means for supporting axles for ground engaging wheels on the leaf springs. At least first, second, and third U-shaped hanger brackets are mounted in spaced relationship in inverted manner to the underside of the frame of the vehicle. A pair of rigid, identical facing equalizer brackets are pivotably mounted to at least the second hanger bracket. Means pivotably mount the first leaf spring to the first U-shaped hanger bracket on one end and to the equalizer brackets on the other end. In like manner, means pivotably mount the second leaf spring to the third U-shaped hanger bracket at one end and to the equalizer brackets at the other end. The first, second, and third U-shaped brackets as well as the equalizer brackets are all formed from an identical blank thereby saving substantial manufacturing costs. The legs of the second U-shaped hanger brackets are spaced slightly farther apart than that of the first U-shaped hanger brackets. The blanks are bent inwardly along one edge and outwardly along another edge to make the equalizer brackets.

The pivotable mounting between the equalizer brackets and the first leaf spring includes a partial circular socket formed in one end of the first leaf spring, a cap having a partial circular socket in complementary relationship with the first leaf spring and means for securing the cap to the end of the leaf spring. A pin is secured to and extends between the equalizer bracket and a compressible bushing surrounds the pin between the equalizer brackets. The bushing is radially compressed onto the pin by the sockets of the leaf spring and cap so that the suspension is yieldably supported on the equalizer brackets to permit a slight canting or axial oscillation of the first leaf spring with respect to the second. This canting may occur, for example, when one of the wheels backs over a curb and the other wheel remains on the pavement. Desirably, the securing means for the cap and leaf spring are removable so as to permit replacement of the compressible bushing should the bushing wear out.

The cap also extends a distance along the top surface of the leaf spring to provide additional support therefor, and means are provided for binding at least two leaves of the leaf spring together to strengthen the leaf spring in the area of the pivotable mounting. The other leaf spring contains a similar mounting but at an end distal from the connector brackets.

The suspension system can be used with two or more leaf springs. For each additional leaf spring, a pair of equalizer brackets and another U-shaped hanger bracket are used to suspend the additional leaf spring.

BRIEF DESCRIPTION OF THE DRAWINGS

The invention will now be described with reference to the accompanying drawings in which:

FIG. 1 is a side elevational view schematically showing a trailer vehicle incorporating a suspension according to the invention;

FIG. 2 is a partial plan view taken along lines 2—2 of FIG. 1;

FIG. 3 is an elevational view seen along lines 3—3 of FIG. 2;

FIG. 4 is a partial sectional view taken along lines 4—4 of FIG. 3;

FIG. 5 is a partial sectional view taken along lines 5—5 of FIG. 3;

FIG. 6 is a partial sectional view taken along lines 6—6 of FIG. 3; and

FIG. 7 is a plan view of a blank used in making the brackets for the suspension according to the invention.

DESCRIPTION OF THE PREFERRED EMBODIMENT

Referring now to the drawings, and to FIG. 1 in particular, there is shown a trailer 12 having a bottom frame 14. Ground engaging wheels 16 are mounted in tandem beneath the frame 14 through a suspension system for supporting of the trailer 12.

Referring now to FIGS. 2 and 3, the suspension system includes a pair of tandem leaf springs 18 and 20, each of which is coupled to a pair of wheels through an axle. There is one suspension system of this nature on each side of the vehicle so that the vehicle actually has 8 wheels 16, although only four such wheels are illustrated in FIG. 2. Thus, an identical suspension system is provided on each side of the vehicle with each suspension system coupling four wheels to the trailer frame. The leaf springs 18 and 20 are relatively wide—about twice as wide as the conventional leaf springs which are used to suspend a single wheel.

Spring hanger bracket 22, connector bracket 24, and spring hanger bracket 26 are all secured as by welding, for example, to the underside of the frame 14 for hanging the leaf springs 18 and 20. Each bracket 22, 24, and 26 is U-shaped in cross-section and the bight portions thereof are welded to frame 14. Opposing equalizer brackets 28 and 30 are pivotably secured to the connector brackets 24 for supporting ends of the leaf springs 18 and 20.

The leaf spring 18 is slidably connected at one end to the spring bracket 22 through a pin 32, secured to the bracket 22, and a bent end 34 on the leaf spring 18.

As illustrated in FIGS. 3 and 5, the other end of the spring 18 is mounted between the equalizer brackets 28 and 30 by a rubber bushed clamp assembly. This assembly includes a cap 38 and a cylindrical rubber bushing 40. The pin 36 is welded to brackets 28 and 30 and the bushing 40 is clamped between the end of leaf spring 18 and the cap 38. The clamping of the bracket 38 and end of spring 18 compresses the rubber bushing 40 around the pin 36. The cap 36 extends down along the top of the leaf spring terminating with an upturned end 39. A U-shaped clamping bracket 41 clamps the end of the cap 38 to four of the five leaves of the leaf spring 18. This extension of cap 38 greatly strengthens the leaf spring 18 in the end of the pivotable connection to pin 36. The clamping bracket can clamp around one or more of the leaves although four is preferred. As seen in FIGS. 4 and 5, the connector brackets 28 and 30 have inwardly turned edges 42 at the top portions thereof and outwardly turned edges 44 at the bottom portions thereof.

The leaf spring 20 is secured to the bracket 26 in a manner identical to the manner in which the leaf spring 18 is secured to the brackets 28 and 30. The connection includes a pin 46 which is welded between the sides of the U-shaped bracket 26. A cap 48 and an end of the spring bracket 20 clamps a cylindrical rubber bushing 50 around the pin 46. The upturned end 49 on the cap 48 retains a clamping bracket 51 which clamps the end of the cap 48 to the leaves of the leaf spring. The other end of the leaf spring 20 is slidably retained by the brackets 29 and 30 through a pin 52 and a bent end 54 of the spring 20.

As illustrated in FIGS. 3 and 4, the brackets 29 and 30 are pivotably mounted to the equalizer bracket 24. To this end, a pin 56 passes through openings in the side of the bracket 24 and is welded thereto. The pin 56 also passes through openings in the brackets 28 and 30. A cylindrical sleeve 58 is welded to the brackets 28 and 30 and surrounds the pin 56. Desirably, a lubricated bushing 60 is provided between the pin 56 and the cylindrical sleeve 58 to permit relatively frictionless rotation of the brackets 28 and 30 with respect to the connector bracket 24. The lubricated bushing can be any suitable lubricating material such as self-lubricating organic materials including polytetrafluoroethylene (Teflon), polyethylene, polypropylene, and the like. The liner can also be made of inorganic fibrous material having lubricating qualities. An example of such material is known commercially as Gatke which is a relatively thick, form retaining brake liner material. This material can be impregnated with lubricants to provide the desired lubricating qualities.

The connection between the axles and the springs will now be described with reference to FIGS. 3 and 6. Each of the axles 62 is connected to the springs 18 and 20 in an identical manner. For the sake of brevity, only the coupling between the spring 18 and the axle 62 will be described.

A pair of U-bolts 64 extend over the axle 62, through a plate 66 beneath the spring 18 and are secured by bolts 67. A seat 68 having downwardly depending flanges 70 and 72 has an opening through which the axle 62 passes and is held firmly against the upper leaves of the spring 18 by the U-bolts 64. the downwardly depending flanges 70 and 72 of the seat 68 give torsional stability to the spring 68 to prevent twisting of the spring with respect to the axle 62. The spring 18 is thus clamped between the seat 68 and the plate 66.

Reference is now made to FIG. 7 which shows a universal bracket blank 74 which is used in making the brackets 22, 24, 26, 28, and 30. The blank 74 can be inexpensively made by a metal stamping process and is generally of oblong shape having holes 76 and 78 at opposite ends thereof. Dotted lines 80, 82, and 84 illustrate the lines on which the blank is bent to make the various brackets. The dotted circular line 86 indicates a hole which is stamped in the blank for the construction of the brackets 29 and 30.

In order to make the spring brackets 22 and 26, the blank 74 is bent 90° about the dotted lines 80 to make the U shape. The holes 78 and 76 receive the pin 32 in the case of bracket 22 and the pin 46 in the case of bracket 26.

In order to form the connector bracket 24, the blank is bent 90° on the dotted lines 82. The opposite ends of the blank 74 are bent towards each other through an angle of 90° on the lines 82 to make the U-shaped connector bracket. As seen in FIG. 3, the depending legs of the connector bracket 24 are slightly shorter than the legs of the spring brackets 22 and 26. This difference in length results in a wider spacing between the legs of the connector bracket 24. This wider spacer is required to accommodate the thickness of the brackets 28 and 30 with the spring 18 there between. The holes 76 and 78 in the blank 74 are provided for the pin 56 of the U-shaped connector bracket 24.

The dotted lines 84 on the blank 74 indicate the bending lines for making the brackets 28 and 30. It will be appreciated that brackets 28 and 30 are identical in construction and are used in facing relationship with respect to each other. One edge of the bracket is folded in one direction about one of the lines 84 and the other edge is folded in the other direction about the other line 84 to make the equalizer brackets 28 and 30. Further, a hole is punched at the circular dotted line 86 to make the opening to pass the pin 56 for the connection between the equalizer brackets 28 and 30 and the connector bracket 24. The holes 76 and 78 of the blank 74 are provided for the pins 52 and 36 for the springs 18 and 20.

Thus, the suspension system according to the invention is made in part from five brackets which originate from the same size stamping. Obvious economies in manufacture are realized with this assembly.

The suspension system of the invention provides a system in which axle misalignment is avoided, tire wear and overstressing of tires is minimized. In the event that the springs have a slightly different set or that one spring is replaced in the group, such replacement will not affect the operation of the suspension. Both axles will bear equal weight because of the equalizer bracket 30. Further, the rotatability of the brackets 28 and 30 minimizes hopping of the vehicle when brakes are applied. The large rubber bushing connections between the brackets and the spring allow some resiliency of the axles with respect to the frame, such as when one of the tires in the two axles is raised, as by a curb. The suspension system makes the replacement of springs easy in the event that the springs break.

Whereas the invention has been described with respect to a suspension system having two leaf springs mounted in tandem, it is to be understood that the suspension can have more than two tandem mounted leaf springs as, for example, when there are three tandem mounted axles. When there are three tandem mounted axles, a second pair of equalizer brackets 28 and 30 would be pivotably mounted to another hanger bracket 24 approximately at the location of bracket 26. The leaf spring 20 would thus be mounted between two sets of equalizer brackets 28 and 30 and the third leaf spring would be spaced to the left of spring 20 (as viewed in FIG. 3). The hanger bracket 26 is thus displaced to the left the space of one leaf spring and the length of the connector brackets 28 and 30.

Reasonable variation and modification are possible within the scope of the foregoing disclosure, the drawings, and the appended claims without departing from the spirit of the invention.

The embodiments of the invention in which an exlusive property or privilege is claimed are defined as follows:

1. In a suspension system for a vehicle including tandem pairs of closely adjacent ground engaging wheel wherein at least first and second leaf springs are positioned between the wheels, means support said leaf springs in tandem beneath said vehicle and means support axles for said ground engaging wheels on said leaf springs, the improvement in said leaf spring support means comprising:
   first, second, and third U-shaped hanger brackets mounted in spaced relationship in inverted manner to the underside of the frame of said vehicle;
   a pair of rigid identical facing equalizer brackets pivotably mounted to said second U-shaped hanger bracket;
   means pivotably mounting said first leaf spring to said first U-shaped hanger bracket on one end and said equalizer bracket at another end;
   means for pivotably mounting said second leaf spring to said equalizer bracket at one end and to said third U-shaped bracket at the other end; and
   said first, second, and third U-shaped brackets and said equalizer brackets being formed by bending identical blanks of sheet metal, such that said brackets have an identical configuration in unbent sheet form.

2. A suspension system according t claim 1 wherein said blank is a flat elongated blank with holes at opposite ends thereof.

3. A suspension system according to claim 1 wherein said equalizer brackets have an upward edge bent inwardly and an lower edge bend outwardly to rigidify said brackets.

4. A suspension system according to claim 3 wherein said pivotable mounting between said equalizer brackets and said first leaf spring includes a partial circular socket formed in one end of said one leaf spring, a cap including a partial circular socket in complementary relationship with said one leaf spring, means securing said cap to said end of said leaf spring, a pin secured to and extending between said equalizer brackets, and a compressible bushing surrounding said pin between said connector brackets and radially compressed thereon by said one end of said leaf spring and said cap, whereby said suspension is yieldably supported on said equalizer brackets to permit slight canting of said first leaf springs with respect to said first and second brackets.

5. A suspension system according to claim 4 wherein the said securing means for said cap and leaf spring are removable so as to permit replacement of said compressible bushing.

6. A suspension system according to claim 4 wherein said cap extends a distance along the top surface of said leaf spring and provides additional support for said leaf spring therealong, and means binding at least two of the leaves of said leaf spring to said extended portion of said cap.

7. A suspension system according to claim 4 wherein said pivotable mounting means between said second leaf spring and said third U-shaped hanger bracket includes a partial circular socket formed in one end of said second leaf spring, a cap including a partial circular socket in complementary relationship with said second leaf spring, and means securing said cap to said end of said second leaf spring, a pin secured to and extending between the legs of said third U-shaped hanger bracket and a compressible bushing surrounding said pin between said legs of said third U-shaped hanger bracket and radially compressed thereon by the sockets of said end of said second leaf spring and said cap, whereby said suspension is yieldably supported on said equalizer brackets to permit slight canting of said second leaf springs with respect to said second and third brackets.

8. A suspension system according to claim 1 wherein said pivotable mounting between said second leaf spring and said third U-shaped hanger bracket includes a partial circular socket formed in one end of said second leaf spring, a cap including a partial circular socket in complementary relationship with said one leaf spring, means securing said cap to one end of said leaf spring, a pin secured to and extended between the legs of said third U-shaped hanger bracket, and a compressible bushing surrounding said pin between the legs of said third U-shaped hanger bracket and radially compressed thereon by said sockets of said second leaf-spring and said cap whereby said suspension is yieldably supported on said equalizer brackets to permit slight canting of said second leaf spring with respect to said equalizer brackets.

9. In a suspension system for a vehicle including tandem pairs of closely adjacent ground engaging wheels wherein first and second leaf springs are operably supported between the wheels in tandem beneath said vehicle, and the wheel axles are supported on said leaf springs, the improvement in said leaf spring support means comprising:
   first, second, and third U-shaped hanger brackets mounted in a spaced relationship in an inverted manner to the underside of the frame of the vehicle;
   a pair of equalizer brackets pivotably mounted to the second U-shaped hanger bracket;
   means pivotably mounting said first leaf spring between said first U-shaped hanger bracket at one end and said equalizer bracket on another end;
   means pivotably mounting said second leaf spring to said equalizer bracket at one end and to said third U-shaped bracket at the other end; and
   one of said pivotable mountings of said first leaf spring including a partial circular socket formed in one end of said first leaf spring, a cap including a partial circular socket in complementary relationship with said first leaf spring, means securing said cap to said end of said first leaf spring, a pin structurally mounted with respect to said first leaf spring, and a compressible bushing surrounding said pin between said equalizer brackets and radially compressed thereon by the sockets of said leaf spring and cap, whereby said suspension is yieldably supported on said pin to permit slight canting of one of said leaf springs with respect to said first and second equalizer brackets.

10. A suspension system according to claim 9 wherein said cap extends a distance along the surface of said leaf spring and provides additional support for said leaf spring, and means binding at least two leaves of said leaf spring together at an end portion of said cap.

* * * * *